United States Patent Office 3,126,404
Patented Mar. 24, 1964

3,126,404
BIGUANIDE ADDUCTS OF PHENYL ISOCYANATE
Kenneth G. Flynn, Bridgeport, Conn., and Dalia R. Nenortas, Richmond Hill, N.Y., assignors to American Cyanamid Company, Stamford, Conn., a corporation of Maine
No Drawing. Filed May 28, 1962, Ser. No. 197,903
5 Claims. (Cl. 260—453)

The present invention relates to adducts of phenyl isocyanate and polymethylbiguanides and has for its object a method for the preparation of the same adapted for use as catalysts. More particularly, it relates to the adducts of phenyl isocyanate and a polymethylbiguanide having from four to six methyl groups in said biguanide.

Phenyl isocyanate adducts prepared by reacting the latter phenyl isocyanate with a polymethylbiguanide are found to be particularly useful as catalysts in the preparation of polyurethane foams. Each of the adducts formed is a solid, soluble in most solvents such as, for instance, acetonitrile, ethanol and benzene, but is insoluble in petroleum solvents, such as petroleum ether and heptane.

Advantageously, equivalent amounts of phenyl isocyanate and the polymethylbiguanide can be swiftly reacted at room temperature. Due to the fact that an exothermic reaction results, no further heating is necessary. However, if the reaction should become violent, the temperature of the reaction vessel can advantageously be brought back to about room temperature by cooling in accordance with techniques known to the art, as for instance, quenching the reactor in an ice bath.

In order to facilitate a further understanding of the invention, the following examples are presented primarily for the purpose of illustrating certain more specific details thereof. The invention is not to be deemed limited thereby except as defined in the claims. Unless otherwise noted, all parts are by weight.

EXAMPLE 1

*Preparation of the Adduct of Phenyl Isocyanate and Tetramethylbiguanide*

Two equivalents (23.8 parts) of phenyl isocyanate dissolved in dry benzene are added dropwise to one equivalent (15.7 parts) of tetramethylbiguanide in the identical dry solvent while stirring the reaction mixture in a suitable reactor at room temperature. The temperature of reaction increases to about 60° C. Thereafter, the contents in the reactor are cooled to room temperature. Solvent is then evaporated and resultant solid is recrystallized from petroleum ether. A yield of 70% of the theoretical is realized. The adduct, soluble in acetonitrile, ethanol, benzene as well as carbon tetrachloride, possesses a melting point from about 67° C. to 69° C.

Microanalytical analysis of the resultant adduct reveals the following in percent:

Calculated for $N_7C_{20}H_{24}O_2$: C, 60.76; H, 6.33; N, 24.31. Found: C, 60.58; H, 6.90; N, 23.83.

EXAMPLE 2

*Preparation of the Adduct of Phenyl Isocyanate and Pentamethylbiguanide*

To a suitable reactor containing one equivalent (8.6 parts) of pentamethylbiguanide in dry benzene are added dropwise two equivalents (11.9 parts) of phenyl isocyanate in dry benzene. The reaction is exothermic and the temperature of the contents of the reactor rises to 45° C. The temperature is next decreased by cooling the reactor to room temperature while simultaneously stirring the contents in the reactor for an additional three hours. Solvent is removed and a colorless oil is obtained. Upon standing for an additional twelve hours, crystals are formed. After recrystallization from petroleum ether, an adduct having a melting point from 94° C. to 97° C. is obtained in a yield of 70%. Upon microanalytical analysis, the following data for the desired adduct is obtained in percent:

Calculated for $N_7C_{21}H_{27}O_2$: C, 61.61; H, 6.60; N, 23,96. Found: C, 62.03; H, 6.52; N, 23.68.

EXAMPLE 3

*Preparation of the Adduct of Phenyl Isocyanate and Hexamethylbiguanide*

Equimolar quantities of phenyl isocyanate and hexamethylbiguanide are mixed in dry hexane while stirring at room temperature in a suitable reaction vessel. Within two hours, the reaction vessel is cooled due to the reaction resulting in an exotherm. A white solid is formed and the latter filtered from the reaction mass. Upon recrystallization from hot heptane, a yield of 95% of desired product is obtained. The adduct possesses a melting point from 124° C. to 125° C. Upon microanalytical analysis in percent, the adduct formed corresponds to the theoretical calculation.

Calculated for $N_7C_{15}H_{24}O$: C, 59.21; H, 7.89; N, 27.63. Found: C, 59.55; H, 7.78; N, 27.12.

Advantageously, each of the adducts formed in the above examples is employed as a catalyst in the preparation of polyurethane foams utilizing conventional methods for obtaining such foams.

We claim:

1. An adduct of phenyl isocyanate and a polymethyl substituted biguanide selected from the class consisting of tetramethylbiguanide, pentamethylbiguanide and hexamethylbiguanide.
2. The adduct of claim 1, wherein substantially equivalent amounts of phenyl isocyanate and said polymethylbiguanide are admixed to form said adduct.
3. The adduct of claim 1, in which the polymethylbiguanide is tetramethylbiguanide.
4. The adduct of claim 1, in which the polymethylbiguanide is pentamethylbiguanide.
5. The adduct of claim 1, in which the polymethylbiguanide is hexamethylbiguanide.

References Cited in the file of this patent

UNITED STATES PATENTS 2,725,385    Seeger et al. _____ Nov. 29, 1955

FOREIGN PATENTS 716,194    Great Britain _____ Sept. 29, 1954